(12) United States Patent
Han

(10) Patent No.: US 6,853,912 B2
(45) Date of Patent: Feb. 8, 2005

(54) DISPLAY METHOD AND APPARATUS FOR NAVIGATION SYSTEM

(75) Inventor: Maung W. Han, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/216,483

(22) Filed: Aug. 10, 2002

(65) Prior Publication Data

US 2004/0204832 A1 Oct. 14, 2004

(51) Int. Cl.$^7$ .......................... G01C 21/00; G06K 9/36; G08G 1/123
(52) U.S. Cl. ...................... 701/208; 701/212; 382/276; 382/279; 382/298; 340/990; 340/995.14; 340/995.15
(58) Field of Search ................................ 345/665, 663, 345/662; 701/208, 212; 382/276, 298, 279; 340/990, 995.14, 995.15

(56) References Cited

U.S. PATENT DOCUMENTS

| | | | | |
|---|---|---|---|---|
| 5,732,385 A | * | 3/1998 | Nakayama et al. | .......... 701/201 |
| 5,748,109 A | * | 5/1998 | Kosaka et al. | .......... 340/995.14 |
| 6,282,490 B1 | * | 8/2001 | Nimura et al. | .......... 340/995.14 |
| 6,445,999 B1 | * | 9/2002 | Nakamura | .................. 701/208 |
| 6,573,842 B2 | * | 6/2003 | Mochizuki et al. | .......... 340/990 |
| 2002/0049532 A1 | * | 4/2002 | Nakamura et al. | .......... 701/208 |

FOREIGN PATENT DOCUMENTS

| | | | | |
|---|---|---|---|---|
| DE | 0793074 A1 | * | 9/1997 | ........... G01C/21/20 |
| JP | 9-244528 | | 9/1997 | |

* cited by examiner

Primary Examiner—Thomas G. Black
Assistant Examiner—Brian Broadhead
(74) Attorney, Agent, or Firm—Muramatsu & Associates

(57) ABSTRACT

A navigation method and system for displaying a map image and shrinking the map image relative to a center point or a reference line on the map image by a non-linear function so that an image outside of the display screen becomes visible on the screen without much decreasing the size thereof. In the first embodiment, the image is coaxially shrinked relative to the center point. In the second embodiment, the images perpendicular to the reference line are shifted toward the reference line. Because of the non-linear function, the images are shrinked with higher degree at around the center point or the reference line than that far away, thereby bringing in the far away images without much decreasing the size thereof. The shrink ratios of the images at the same distance from the center point or the reference line are the same throughout the display screen.

16 Claims, 12 Drawing Sheets

21 Screen View

Scroll

21 Screen View

21 Screen View

↕ Zoom

21 Screen View

Parabolic Scaled Map

Map Scale

Enter

Enter

Enter    Cancel

DISPLAY METHOD AND APPARATUS FOR NAVIGATION SYSTEM

FIELD OF THE INVENTION

This invention relates to a display method and apparatus for a navigation system, and more particularly, to a method and apparatus for shrinking a map image relative to a center point or a reference line on a display screen by a linear or non-linear function so that an image outside of the display screen becomes visible on the screen without much decreasing the size thereof.

BACKGROUND OF THE INVENTION

A navigation system performs travel guidance for enabling a user to easily reach the selected destination. A typical example is a vehicle navigation system. The present invention is not limited to a vehicle navigation system but is applicable to other types of navigation system such as a PDA (Personal Data Assistant), a cellular phone, and other portable navigation devices. However, for the convenience of explanation, the following description is made mainly for the vehicle navigation system.

Such a navigation system detects the position of the vehicle, reads out map data pertaining to an area at the vehicle current position from a data storage medium, for example, a CD-ROM (compact disc read-only memory), a DVD (digital versatile disc) or a HDD (hard disc drive), and displays a map image on a monitor screen (display) while superimposing a mark representing the current location of the vehicle on the map image. Alternatively, such map data can be provided to the vehicle from a remote server through a communication network such as Internet.

The vehicle position is determined by a self-contained navigation sensors (e.g. a distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either method, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

FIG. 1A shows an example of a locator map display containing a current vehicle position mark VP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

FIG. 1B shows an example of route guidance display which performs the route guidance function. The route guidance display is activated after specifying the destination. In this example, the current street "W 190TH ST" and the left side of the next street "PRAIRIE AVE" will be highlighted in the map image 21 to show the direction of turn at the next intersection. In addition, this example further shows an arrow indicating the direction (left) in which the vehicle is to turn at the intersection in a guidance information box 22 at the top of the screen. The guidance information box 22 also shows the name of the street "PRAIRIE AVE" which intersects with the current street "W 190TH ST" and a distance to the intersection. Thus, the navigation system indicates that the vehicle should make a left turn at the intersection with "PRAIRIE AVE".

Further to the highlighted display, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

During the map screen mode of FIG. 1A or route guidance mode of FIG. 1B, there arises a situation where a user wants to see a place or places outside of the map currently displayed on the screen. For example, before entering the route guidance mode, a user wants to specify a destination on the map image rather than inputting a place name or selecting the prestored address data. Even during the route guidance mode, the user may want to temporarily leave the guided route to go to a restaurant, or other points of interest. In other instance, a user may want to compare two areas, which are far apart from one another and thus outside of the current display screen, by displaying the two areas side by side.

In the conventional navigation system, such areas outside of the current screen can be displayed by either scrolling the screen or zooming out the screen. FIGS. 2A and 2B show an example of a display scroll function for shifting the map screen on the display. By operating scroll keys in up-down and right-left directions, what was outside of the screen view of FIG. 2A becomes visible within the screen view of FIG. 2B.

FIGS. 3A and 3B show an example of a display zoom function for changing the size of an area, i.e, a map scale in the screen view. As is well known in the art, when pressing a zoom key, the map scale either increases or decreases continuously. In the example of FIGS. 3A and 3B, by operating the zoom key to display a wider area in the screen of FIG. 3B than that of FIG. 3A, i.e., by zooming out, the places outside of the screen of FIG. 3A become visible within the screen view of FIG. 3B.

The foregoing conventional methods are not very convenient for a user, especially, when the user is driving the vehicle. For example, in scrolling the display image as in FIG. 2B, the user has to operate the scroll key in right/left and up/down directions while watching the map image on the screen until the desired place comes in the screen. This process adversely affects the safe driving as well as takes a relatively long time.

In the case of using the zoom function, by changing the map scale in using the zoom key as in FIG. 3B, the user can bring the desired place within the screen by displaying the larger area in one screen. However, in such a zoom function, all of the map images become small when displaying a larger area at once as shown in FIG. 3B. Thus, if the intended place is relatively far away from the displayed map image, the intended place that the user wants to see will be displayed with too small a size, which makes it difficult to discern the desired place or its surrounding situations. Thus, the user usually has to scroll the display prior to zooming the map image to obtain the optimum map image. Again, this process adversely affects the safe driving as well as takes a long time.

Therefore, in the navigation system, there is a need of an easy and effective way to display the image outside of the current screen view without substantially decreasing the size of the image. There is another need in the navigation system to easily display two areas far apart from one another in a side by side fashion to compare the two areas. There is a further need of an efficient way to bring the map image outside of the screen within the display screen without affecting the driving.

SUMMARY OF THE INVENTION

It is, therefore, an object of the present invention to provide a navigation method and system for easily and quickly displaying a map image that has been outside of the display screen without substantially decreasing the size of the image.

It is another object of the present invention to provide a navigation method and system for easily and quickly displaying a map image that has been outside of the display screen by shrinking the image by a non-linear function relative to a center point or a reference line without using the conventional scroll function or zoom function.

It is a further object of the present invention to provide a navigation method and system for easily and quickly displaying two far away areas side by side that have been outside of the display screen.

In the present invention, the navigation method and system is designed to shrink the map image relative to a center point or a reference line on the display screen by a non-linear or linear function, thereby displaying the image that has been outside of the screen easily and quickly without much decreasing the size. The navigation method comprises the steps of: displaying a map image on the screen and specifying a center point on the map image, and shrinking the map image coaxially relative to the center point based on a non-linear function so that map images close to the center point shrink in a degree higher than map images far away from the center point, thereby displaying the images that have been outside of the screen without much decreasing sizes thereof.

In the navigation method of the present invention, the process of shrinking the map image applies the non-linear function to a relationship between a map scale of an image and a distance of the image from the center point so that the map scale changes greatly for the distance close to the center point while changes slightly for the distance far apart from the center point. Preferably, the map scale is regulated by changing a coefficient of the non-linear or linear function.

In another aspect of the present invention, the navigation method comprises the steps of: displaying a map image on the screen and specifying a reference line on the map image, and shrinking map images in directions perpendicular to the reference line based on a non-linear or linear function so that map images close to the reference line shrink in a degree higher than map images far apart from the reference line, thereby displaying images both sides of the reference line in the directions perpendicular to the reference line that have been outside of the screen without much decreasing sizes thereof.

The process of shrinking the map image applies the non-linear function to a relationship between a map scale of an image and a distance of the image from the center point so that the map scale changes greatly for the distance close to the center point while changes slightly for the distance far apart from the center point. Preferably, the map scale is regulated by changing a coefficient of the non-linear function. Preferably, an angle of the reference line is regulated or rotated for selecting images in directions perpendicular to the reference line to be shrinked by the non-linear function.

A further aspect of the present invention is a navigation system configured by various means for achieving the navigation method described above which shrinks the map image by the non-linear function relative to the center point or reference line on the map image.

According to the present invention, the navigation method and system of the present invention is designed to easily and quickly display the map image that has been outside of the display screen without using the conventional scroll function or zoom function. The navigation method and system shrinks the image by a non-linear fashion relative to a center point or a reference line so that the images at around the center point or reference line shrink with higher degrees than that of the other portion. Thus, the map image that has been outside of the display screen will be drawn to the display screen without substantially decreasing the size thereof. Further, the map shrink function of the present invention is useful to see and compare two areas side by side, even when such two areas are far away and outside of the screen view.

DETAILED DESCRIPTION OF THE INVENTION

The display method and apparatus of the present invention will be described in more detail with reference to the accompanying drawings. While the present invention will be described in conjunction with a vehicle navigation system, it will be understood that the present invention is not limited to such a specific application. For example, the present invention can also be applicable to a portable (hand-held) navigation system, a portable data terminal such as a personal digital assistant (PDA), a lap top computer with a navigation function, and the like.

The navigation method and system of the present invention brings the image that has been outside of the screen view within the screen view by shrinking the image by a non-linear function. Such a shrinking of the image can also be conducted by a linear function although the non-linear function achieves a superior effect. In the first embodiment, the image is shrinked relative to the center point of the display, and in the second embodiment, the image is shrinked relative to the reference (fold) line. Because of the non-linear function, the image is shrinked with higher degree at the center point or the reference line than the outer area, thereby bringing in the image of the outer area without much decreasing the size thereof.

Typically, such a non-linear function is a hyperbolic function in which an arbitrary constant number (coefficient) of the function is changed to regulate the curve (shrink rate or map scale) of the function with respect to distances from the center point or reference line. In the second embodiment, an angle of the reference line can be freely changed, i.e., rotated, by key operations so that images in two selected directions are shrinked by the non-linear function. In the present invention, the image outside of the screen comes within the screen without much reducing the size while the images at around the center or the reference line of the screen becomes dramatically small to be almost invisible.

Figure 1A:
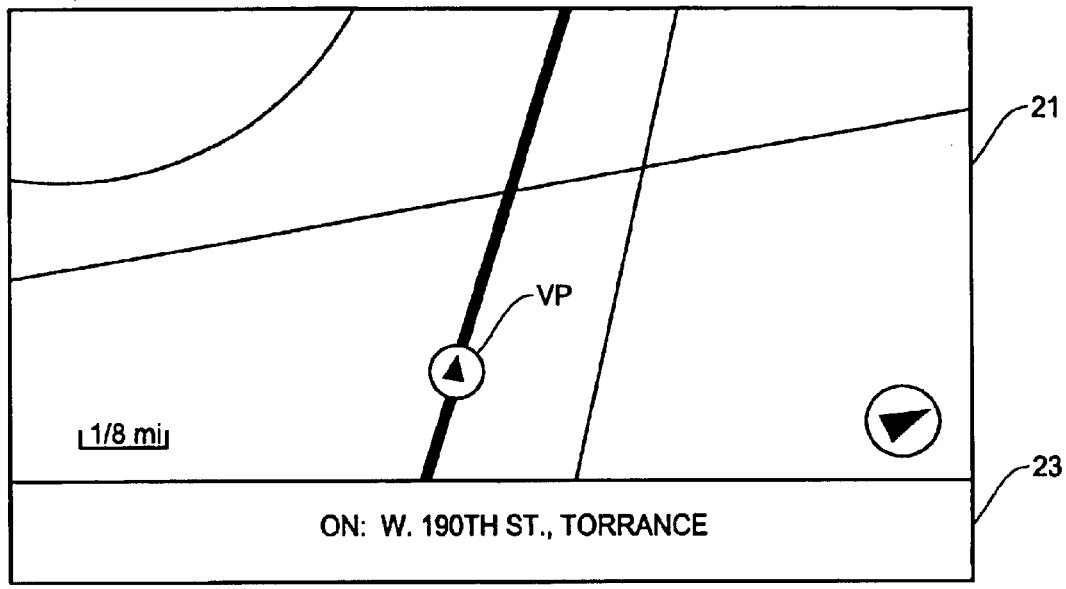
FIGS. 1A and 1B are schematic diagrams showing an example of locator map display and route guidance display, respectively, of a navigation system.
Figure 1B:
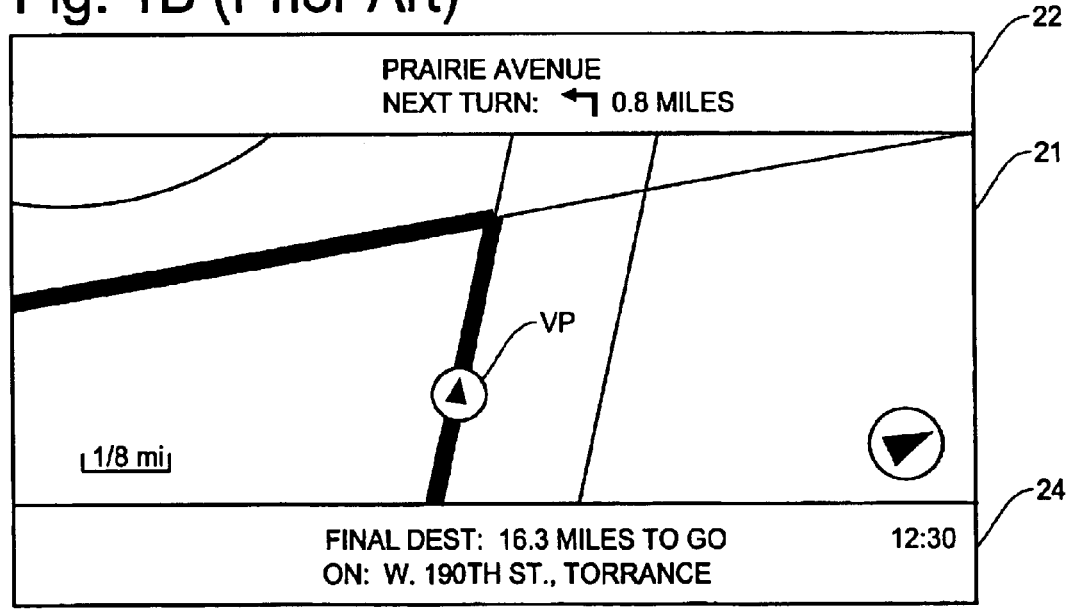
Figure 2A:
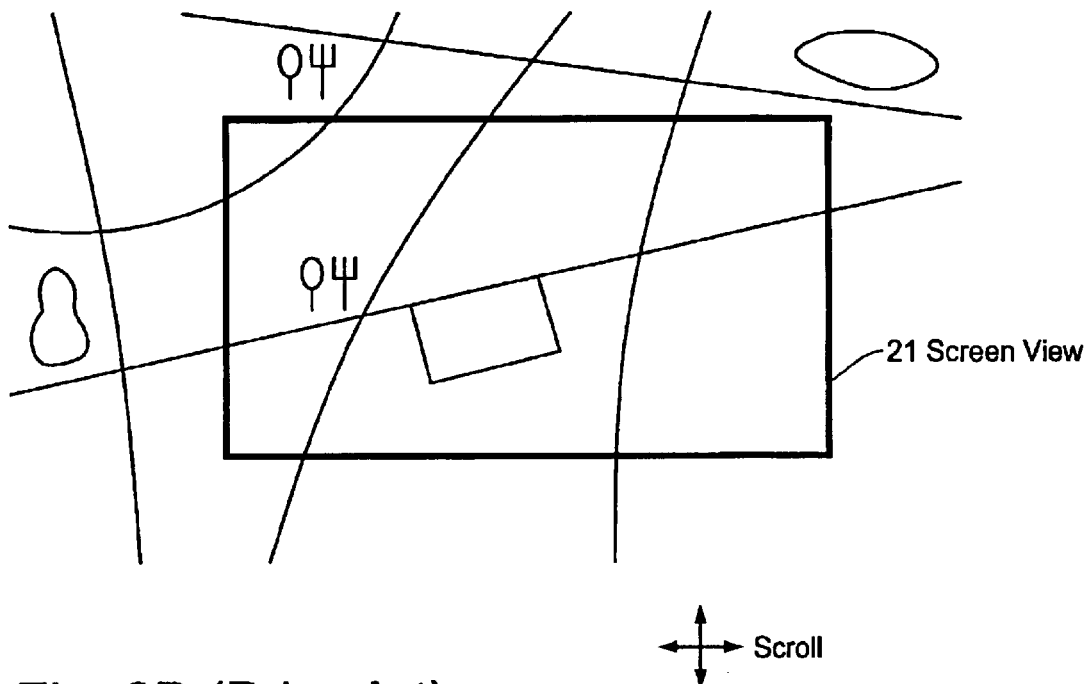
FIGS. 2A and 2B are schematic diagrams showing an example of shifting the map image by using a scroll function of a navigation system to bring in the map image that has been outside of the screen of the navigation system.
Figure 2B:
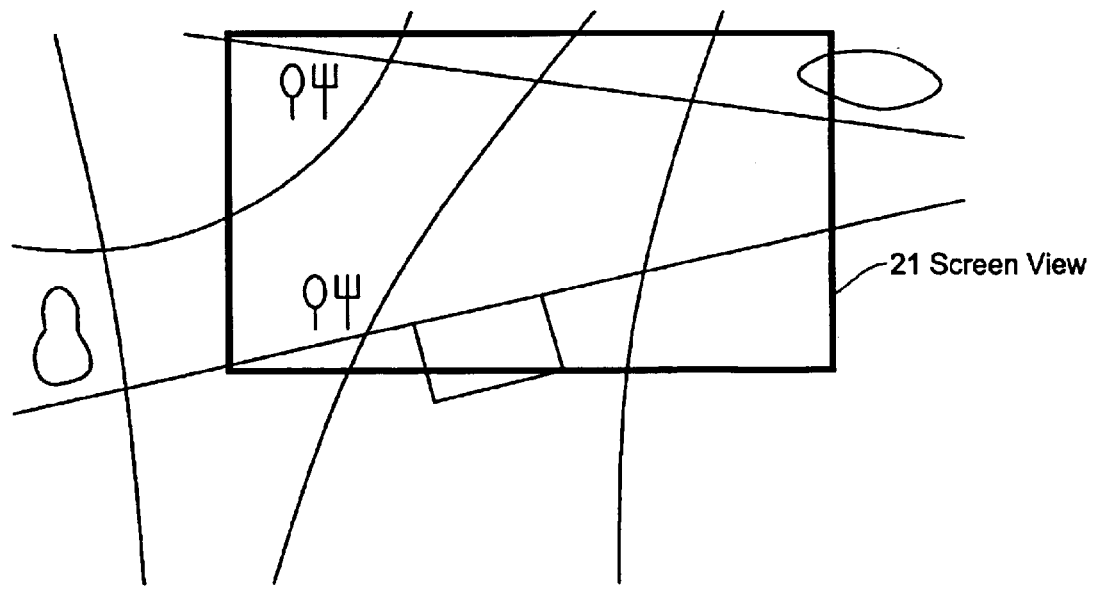
Figure 3A:
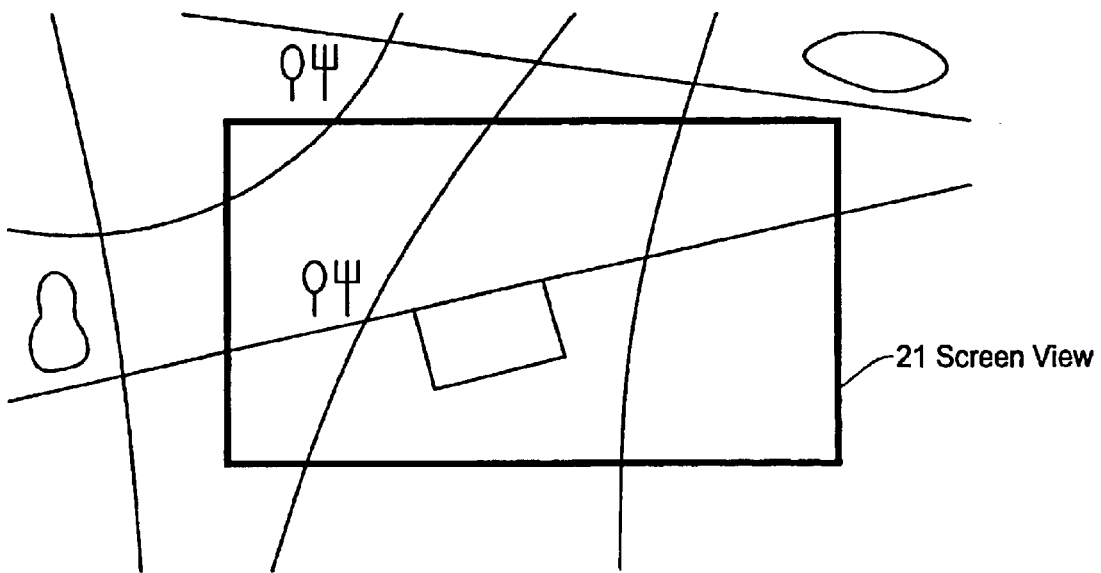
FIGS. 3A and 3B are schematic diagrams showing an example of changing the map scale of the image by using a zoom function of the navigation system to display the map image that has been outside of the screen.
Figure 3B:
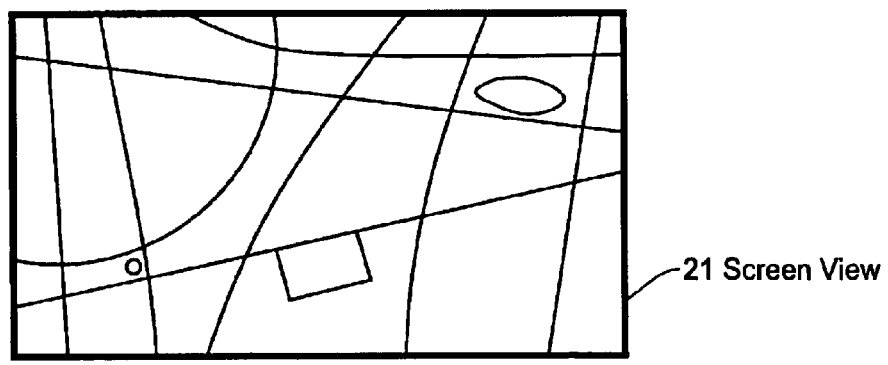
Figure 4:
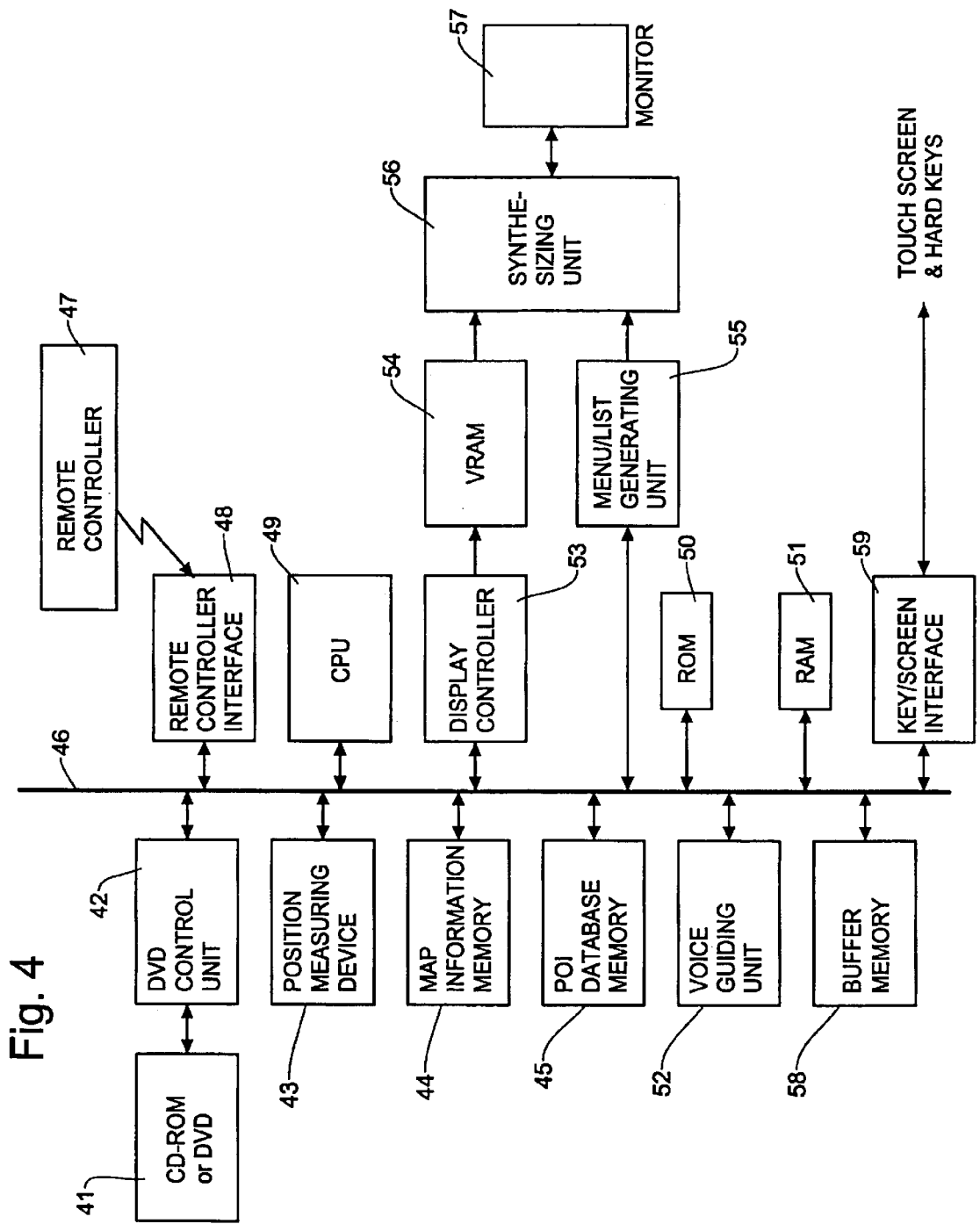
FIG. 4 is a block diagram showing an example of structure in a vehicle navigation system according to the present invention.
Figure 5A:
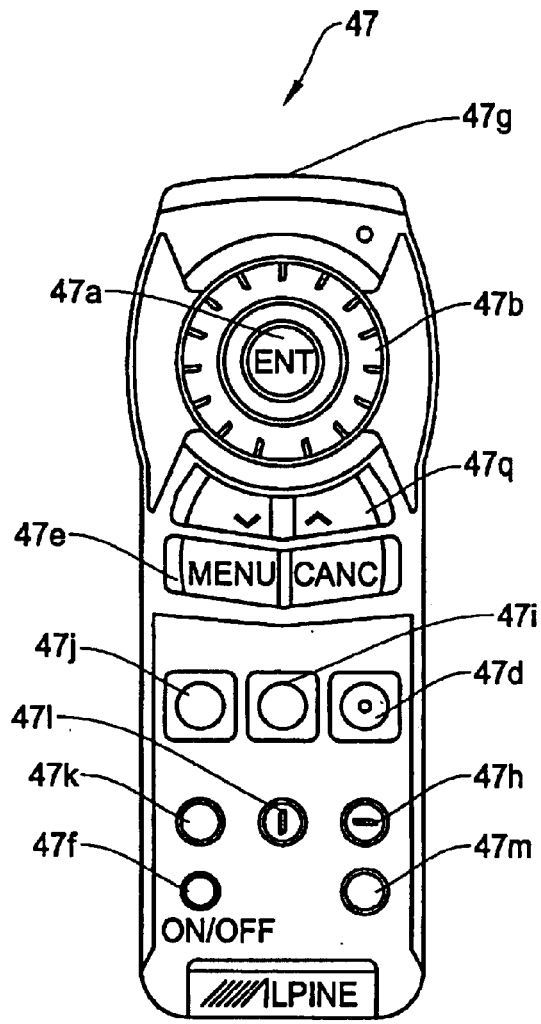
FIGS. 5A and 5B are diagrams showing an example of a remote controller accompanied by the vehicle navigation system of the present invention.
Figure 5B:
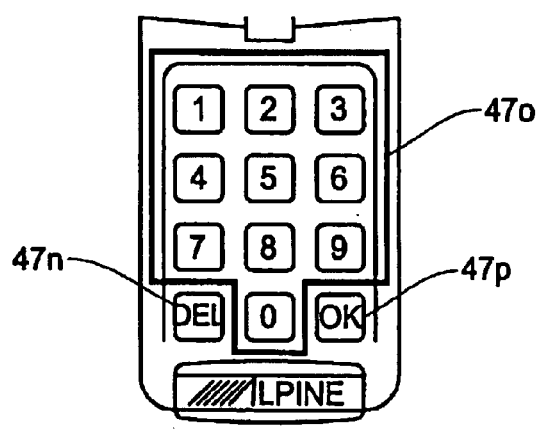

Before going into details of the POI searching and sorting method of the present invention, a brief description is made regarding the basic structure of the navigation system with reference to the block diagram of FIG. 4 and an example of remote controller for the navigation system with reference to FIGS. 5A and 5B.

In the block diagram of FIG. 4, the navigation system includes a map storage medium 41 such as a CD-ROM, DVD, hard disc or other storage means (hereafter "DVD") for storing map information, a DVD control unit 42 for controlling an operation for reading the map information from the DVD, a position measuring device 43 for measuring the present vehicle position. The position measuring device 43 has a vehicle speed sensor for detecting a moving distance, a gyroscope for detecting a moving direction, a microprocessor for calculating a position, a GPS receiver, and etc.

The block diagram of FIG. 4 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

The remote controller 47 has a variety of function keys as shown in FIG. 5A and numeric keys as shown in FIG. 5B. The numeric keys appear when a lid in the lower part of FIG. 5A is opened. The remote controller 47 includes a joystick/enter key 47a, a rotary encoder 47b, a cancel key 47c, an MP/RG key 47d, a menu key 47e, a zoom/scroll key 47q, a monitor ON/OFF key 47f, a remote control transmitter 47g, a plan key 47h, an N/H key 47i, a voice key 47j, a list key 47k, a detour key 47l, a delete destination key 47m, a delete key 47n, numeric keys 47o, and an OK key 47p.

The joystick/enter key 47a selects highlighted items within the menu and moves map displays and a vehicle position icon. The rotary encoder 47b changes zoom scale, scrolls list pages, moves the cursor, and etc. The cancel key 47c cancels the present displayed screen or is operated when returning the screen to the previous menu screen. The MP/RG key 47d toggles between detailed map display and basic guide display during guidance. The menu key 47e displays the main menu. The plan key 47h starts the guidance to the route set by "Today's Plan" function, the N/H key 47*i* changes between "North-up" and "Heading-up" orientation, and the voice key 47*j* initiates voice instruction.

Although a remote controller such as described above is a typical example for selecting menus, executing selected functions and etc., the navigation system includes various other input methods to achieve the same and similar operations done through the remote controller. For example, a navigation system may include hard keys and a joystick on a head unit of the navigation system mounted on a dash board, touch screen of the display panel, and voice communication means.

Referring back to FIG. 4, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice interface and guiding unit 52 for voice communication interface and spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, a buffer memory 58 for temporarily storing data for calculation, etc., and a key and screen interface 59 for interfacing with various other input means such as hard keys and joystick on a display panel of the navigation system or a touch screen of the navigation system, and the like.

Figure 6A:
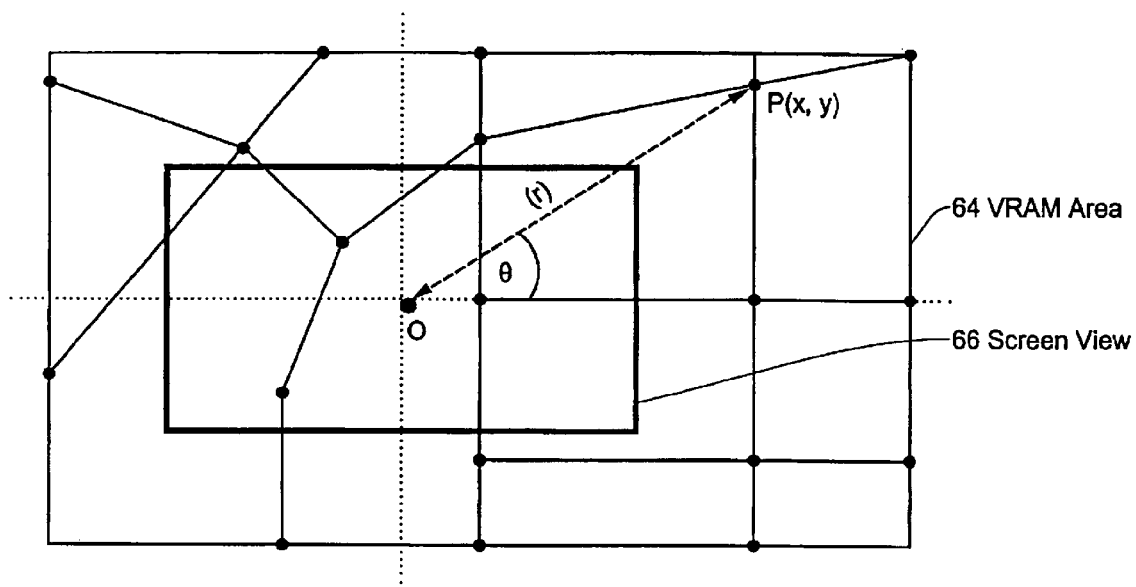
FIGS. 6A and 6B are diagrams showing an example of shrink function of the present invention in the first embodiment where the map image outside of the screen view in FIG. 6A is brought in the screen view in FIG. 6B by shrinking the image relative to a center point of the display by a non-linear function.
Figure 6B:
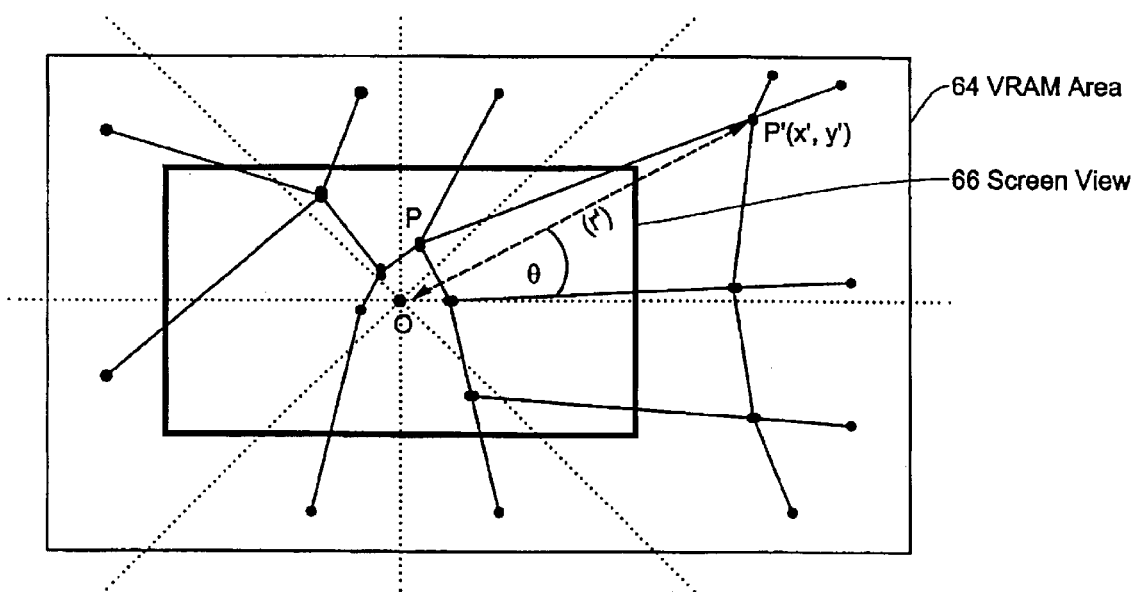

Now, the navigation method and system of the present invention is described with reference to FIGS. 6–14. FIGS. 6A and 6B show the concept in the first embodiment of the present invention where the map image is shrinked relative to the center point O of the screen. Namely, the map image is shrinked coaxially with respect to the center point O. As noted above, in the present invention, preferably, the shrink rate (map scale) is not uniform throughout but changes according to the non-linear function in such a way that the map image close to the center point shrinks much more than the map image in the outer area. Accordingly, the images outside of the screen come within the screen without much reducing its size while the images close to the center of the screen significantly become small. Although the non-linear function of the shrink rate is preferable, a linear function can also be used in the present invention to shrink the map image in the constant rate throughout.

In FIGS. 6A and 6B, a screen view 66 represents an actual display screen showing the map image within the view area (such as a monitor 57 in FIG. 4). Image data is acquired in a VRAM area 64 (such as a VRAM 54 in FIG. 4) which covers an area substantially larger than the screen view 66. Such image data is retrieved from a map data storage, typically from a DVD 41 in FIG. 4 or from a remote navigation server through a communication network such as Internet.

In the first embodiment, as shown in FIGS. 6A and 6B, the map image is shrinked non-linearly toward the reference center O (center shrink scaling). Typically, the reference center (center point) O is a center of the display screen, however, the position of the reference center can be freely changed in the navigation system such as through a system setup process. In FIG. 6A, r represents a distance of a node point P from the center point O, θ is an angle of the radial line from the center point O to the node point P, and (x, y) are coordinates of the node point P.

In applying the center shrink scaling in FIG. 6B, the node point P moves toward the reference center O well within the screen view 66. By this shrink function, a new node point P' (x', y') is now within the VRAM area 64. In FIG. 6B, r' is a radial distance after applying the reverse parabolic scaling (non-linear shrink) to the node P' (x', y'), and f(r) is a reverse parabolic scaling function which is defined as:

$$f(r)=r/[(1/ar^2)+1]$$

where a is an arbitrary parameter (coefficient).

$$r'=r/[(1/ar^2)+1]$$

Then, $$x'=r'\cos\theta$$

$$x'=r\cos\theta/[(1/ar^2)+1]$$

$$x'=(ar^2)x/[1+ar^2]$$

Since $r\cos\theta=x$ $$X'=a(x^2+y^2)x/[1+a(x^2+y^2)]$$

Since $r^2=x^2+y^2$, assigning $A=a(x^2+y^2)$ $$x'=Ax/(1+A)$$

Similarly, $$y'=Ay/(1+A)$$

Using the above scaling functions will cause the nodes (images) nearer to the center point O will be drawn to the center faster and become hidden. Those nodes (images) far away from the center point O, thus not previously seen in the screen view 66, will also been drawn into the view area of the screen 66. Thus, this shrink method will enable a user to view a wider surrounding area of the display screen without scrolling around.

Figure 7A:
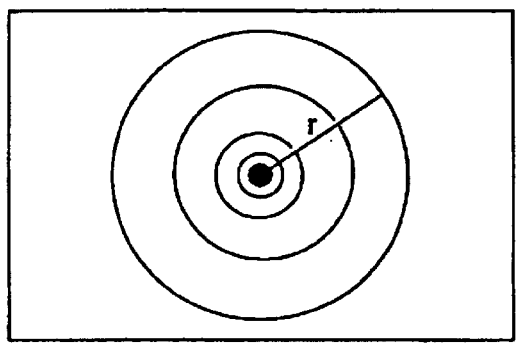
FIGS. 7A and 7B are diagrams showing the concept in the first and second embodiments of the present invention where the map image is shrinked by a non-linear function such as a hyperbolic scale.
Figure 7B:
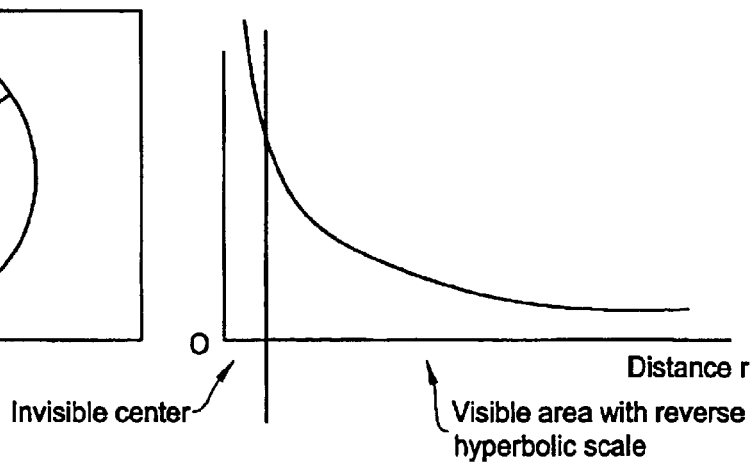

FIGS. 7A and 7B show the concept of the center shrink scaling by the non-linear function in the first embodiment of the present invention. The map image is shrinked by the non-linear function, such as the reverse parabolic function noted above. In using such a non-linear function, as shown in FIGS. 7A and 7B, the map image is shrinked with higher degrees toward the center. In other words, the map scale changes rapidly at the center O so that the map image may become invisible at the center point or close to the center point O. In contrast, with increase of the distance r from the center O, the map scale changes in a small degree and becomes almost constant. Because of the non-linear shrinkage, the map image that is previously outside of the screen view 66 is drawn within the screen view 66 easily and quickly. Although the non-linear function of the shrink rate is preferable as described above, a linear function can also be used in the present invention to shrink the map image in the constant rate throughout.

Figure 8:
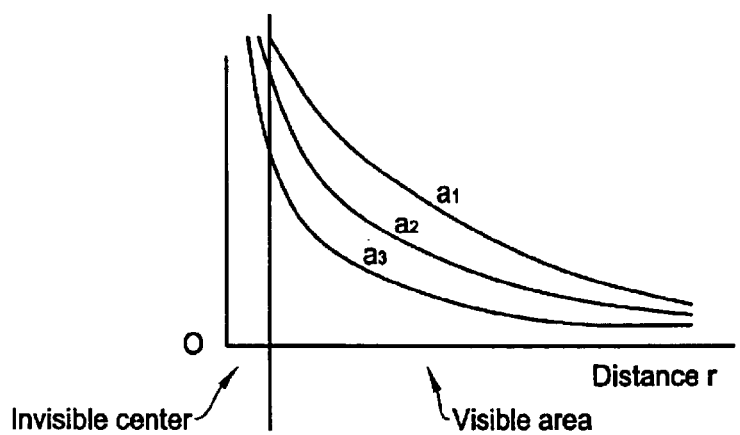
FIG. 8 is a diagram showing an example of non-linear function curves for shrinking the map image with different degrees by selecting an arbitrary parameter.

FIG. 8 shows different curves of the reverse parabolic function (map scale versus distance) in response to different parameters (coefficient) a. As noted above, since the reverse parabolic function is $f(r)=r/[(1/ar^2)+1]$, such a non-linear curve can be adjusted by changing the arbitrary parameter a to $a_1$–$a_3$ where $a_1 \geq a_2 \geq a_3$. For example, as shown in FIG. 8, when the parameter (coefficient) a is large such as $a_1$, the curve becomes more like a linear line while the parameter a is small such as $a_3$, the curve becomes more steep so that the map scale changes rapidly at about the center point O. For example, the navigation system is so designed that when the user keeps pressing the enter key, the arbitrary parameter (coefficient) is changed continuously from $a_1, a_2, a_3, \ldots$ to $a_n$, thereby achieving the optimum effect of the map shrink function.

Figure 9A:
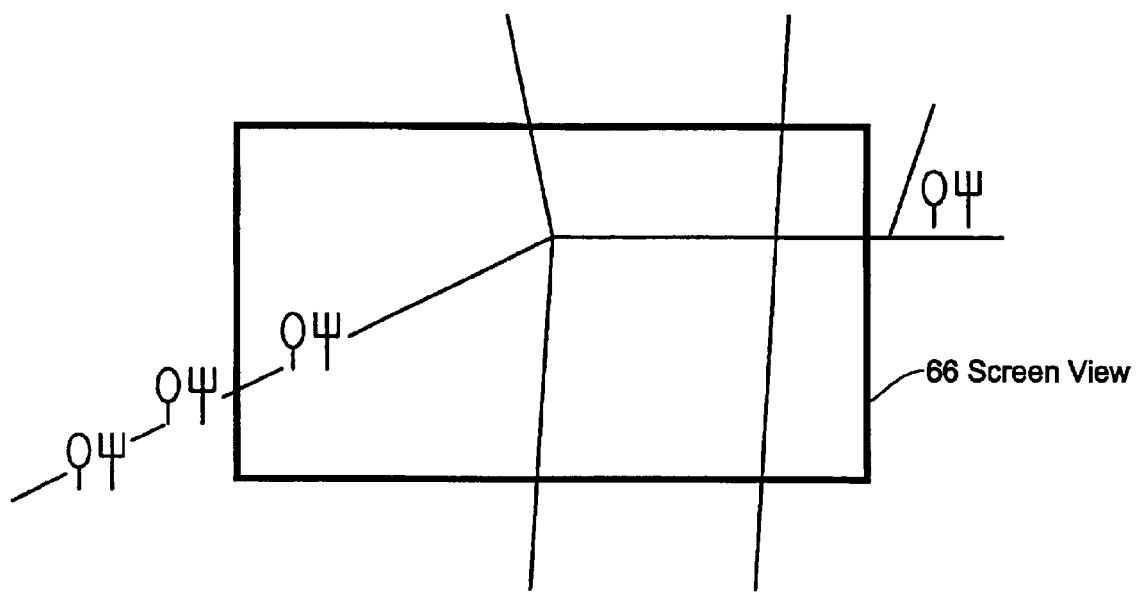
FIGS. 9A and 9B are diagrams showing an example of shrink function of the present invention in the second embodiment where the map image outside of the screen view in FIG. 9A is brought in the screen view in FIG. 9B by shrinking the image relative to a reference line by a non-linear function.
Figure 9B:
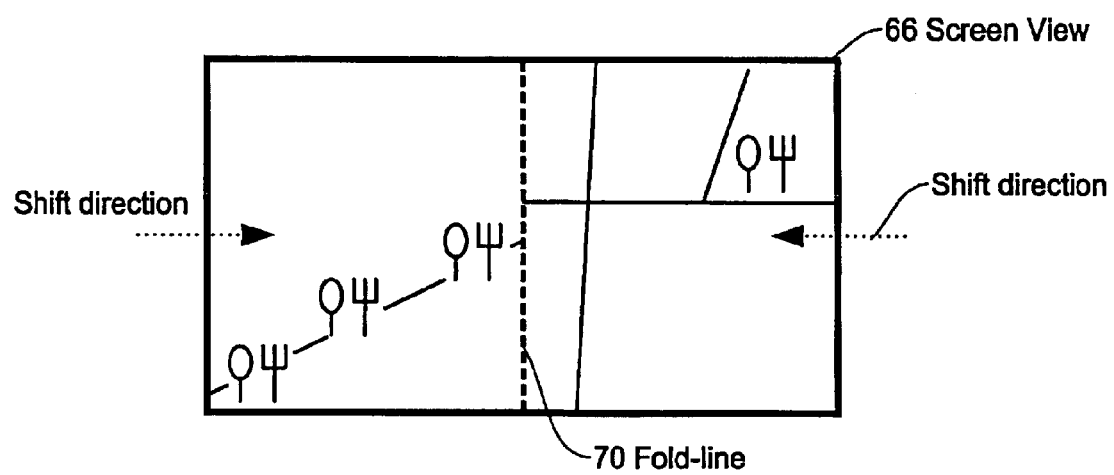

FIGS. 9A and 9B show the second embodiment of the present invention in which the map image is shrinked relative to a reference line (fold line) by a non-linear function or a linear function. As described below, the non-linear function achieves a better performance. As a result of shrinking, the map image outside of the screen view 66 in FIG. 9A is brought into the screen view 66 in FIG. 9B without scrolling the screen. In the example of FIG. 9B, the fold line (reference line) 70 is at the center in a vertical direction, although the angle and position of the fold line 70 can be freely changed as described later.

The map shrink function of the second embodiment of the present invention is useful for a user to see two far apart areas side by side. In FIG. 9A, two areas of the map cannot be viewed together if they are far apart and thus outside of the screen view 66. For example, this problem can arise when a user would like to compare two areas, such as two parts of a city, to see which area has more POIs (point of interest) without scrolling. By shrinking the map by a non-linear function with reference to the fold line (reference line 70), it is able to simulate a foldable paper map whereby a user can see two far apart areas side by side on the screen while hiding the intermediate area between them. In the example of FIG. 9B, the map images in the right and left sides shift toward the fold line 70 in the directions perpendicular to the fold line as shown by the dotted line arrows.

Figure 10A:
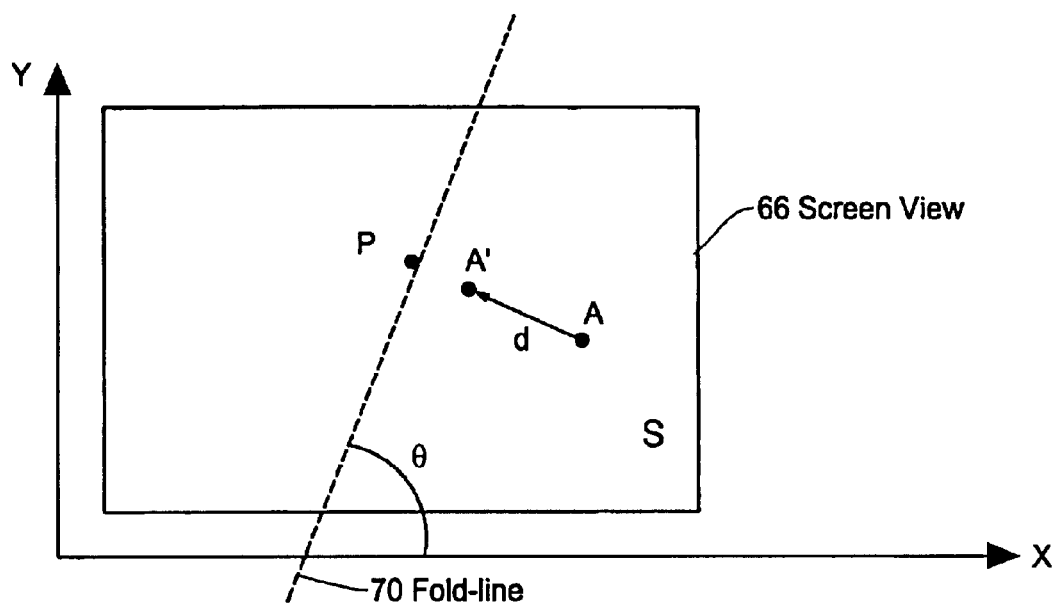
FIGS. 10A and 10B are diagrams showing the concept in the second embodiment of the present invention where the map image is shrinked at the reference line on the display where the angle of the reference line is varied.
Figure 10B:
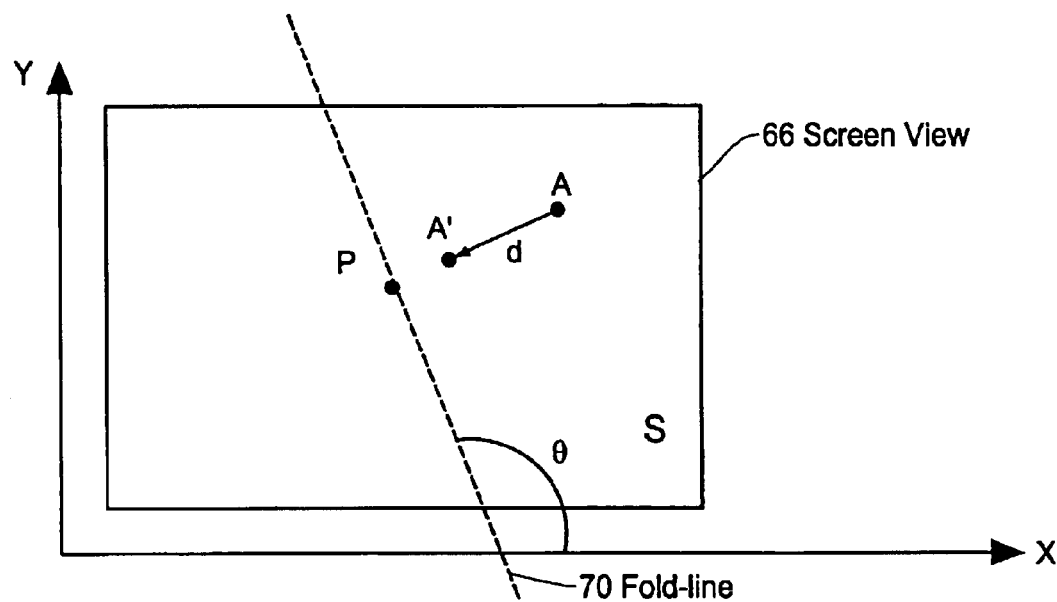

FIGS. 10A and 10B show a generalized situation where the fold line (reference line) 70 is expressed with an angle $\theta$ relative to the horizontal axis X. In the present invention, the fold line 70 can be rotated to select a desired angle so that the map images both sides of the fold line in the directions perpendicular are shifted (shrinked) toward the fold line 70. Since the map image is shrinked by the non-linear function such as the reverse parabolic function noted above, the map images far apart from one another and outside of the screen view 66 are brought in the screen view 66 without scrolling the display.

In FIG. 10A, A represents an arbitrary point on the map with coordinates (x, y), A' is a new point with coordinates (x', y') after shifting the point A, P represents a project point of A onto the fold line 70 with coordinates $(x_p, y_p)$, d is a displacement of the point A to the new point A' toward the fold line 70, s is the side of the fold line 70 where the point A is located (ex. "1" for the right side of the fold line 70 and "−1" for the left side of the line 70), and $\theta$ represents an angle that the fold line 70 is forming with the X axis.

Assuming the side s and projection point P are known (by using standard mathematical formulas), $\theta$ is known from the angle a user has selected, and the coordinates (x, y) are known from the original position of the point A. Then x' and y' can be calculated as follows:

$$x'=x-sd\sin(\theta) \text{ or more generally, } x'=g(X)$$

$$y'=y+d\cos(\theta) \text{ or more generally, } y'=g(Y)$$

Then, following display criteria are applied to decide if the new point A' (X', Y') should be displayed or hidden. In other words, the following criteria check whether those points near the fold line 70 has disappeared.

If $|x-x'| \leq |x-x_p|$, then the new point A' should be displayed, otherwise, the new point A' should be hidden.

Applying the above calculation and display criteria to every point on the map, it is able to achieve the foldable map effect where the map image is shrinked relative to the fold line (reference line) 70.

FIGS. 11–14 show examples of process and display image in applying the present invention to the navigation system. It should be noted that the examples here are described only for an illustration purpose and thus the implementation of the present invention is not limited to these examples. FIGS. 11A–11D show an example of process in the early stage of the shrink function (non-linear map scale) of the present invention implemented in the navigation system. The shrink function can be activated at various situations of the navigation system such as a main menu screen of FIG. 11A or a map screen of FIG. 11B.

Figure 11A:
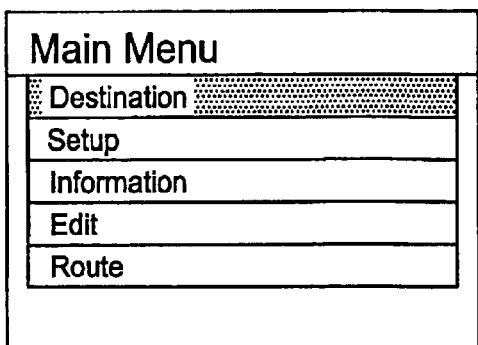
FIGS. 11A–11D are schematic diagrams showing an example of process and display images for operating the shrink function of the present invention on the navigation system.
Figure 11B:
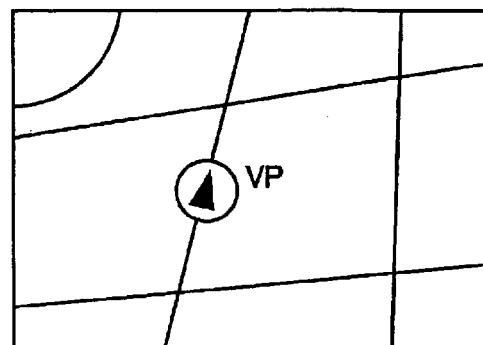
Figure 11C:
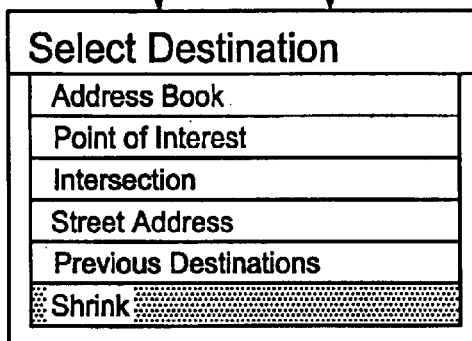

In the main menu screen of FIG. 11A, by selecting a "Destination" menu, the navigation system displays a "Select Destination" screen as shown in FIG. 11C. The "Select Destination" menu provides various input methods for selecting a destination such as by "Address Book", "Point of Interest", "Street Address", or "Previous Destinations" as is well known in the art. In this example, the input method also includes a "Shrink" bar for activating the shrink function of the present invention. The "Select Destination" screen of FIG. 11C can also be established through the map screen of FIG. 11B by, for example, pressing an enter key. Then, the screen of FIG. 11C comes out (pop-ups) on the navigation system.

Figure 11D:
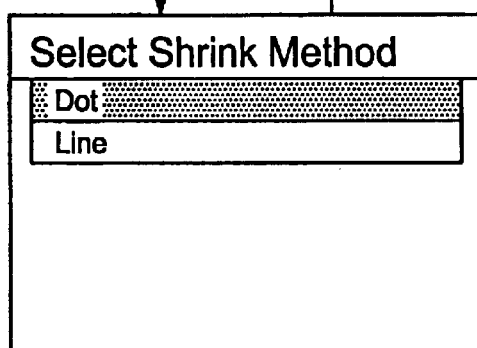

By selecting (highlighting) the "Shrink" bar in FIG. 11C and pressing the enter key, the navigation system moves to a "Select Shrink Method" screen of FIG. 11D. In this example, the shrink methods include a "Dot" method and a "Line" method. The "Dot" method is to select the first embodiment of the present invention for coaxially shrinking the map image relative to the center point. The "Line" method is to select the second embodiment of the present invention for shrinking the two side images relative to the reference line (fold line).

Figure 12A:
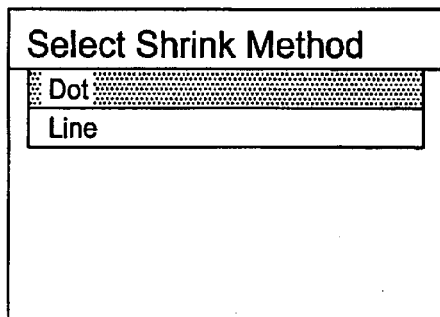
FIGS. 12A–12C are schematic diagrams showing an example of process and display images for operating the shrink function in the first embodiment of the present invention on the navigation system where the map image is shrinked relative to the center point.
Figure 12B:
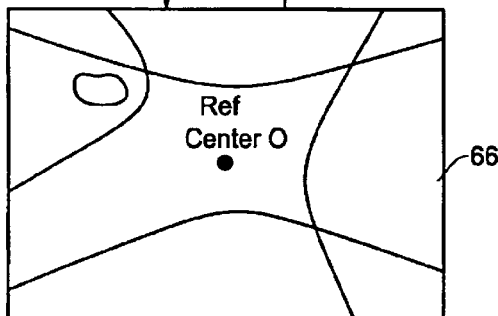
Figure 12C:
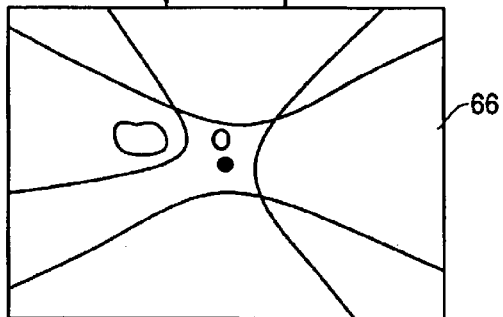

FIGS. 12A–12C show an example of process and display images for operating the shrink function on the navigation system after the process of FIG. 11 when selecting the "Dot" method. The screen of FIG. 12A is the same as that of FIG. 11D in which the "Dot" method is selected. By pressing the enter key, the navigation system provides map images of FIG. 12B in which the map images are coaxially shrinked toward the center point O.

As noted above, because of the non-linear function such as the reverse parabolic function, the images at the center area or proximate to the center O are shrinked with a degree much higher than the images far away from the center O. Thus, while the map images at the center area may become invisible, the map images previously outside of the screen come in the screen view 66 without much decreasing their sizes. Accordingly, it is possible to quickly and easily see the places far away from the previous map image without scrolling around the map image.

As described in the foregoing with reference to FIG. 8, the navigation system can change the non-linear curve by changing the coefficient from $a_1$ to $a_n$ to find an optimum shrink rate. This can be done, for example, by pressing the enter key in the center shrink screen of FIG. 12B. Every time when the enter key is pressed, the navigation system changes the coefficient of the non-linear curve so that the images are further shrinked toward the center point O as shown in FIG. 12C. Conversely, when it is desired to decrease the shrink rate, the user can press the cancel key, for example, to find an optimum shrink rate. As seen from FIGS. 12B and 12C.

the shrink rate of the images at the same coaxial distance from the center point are the same throughout the display screen.

Figure 13A:
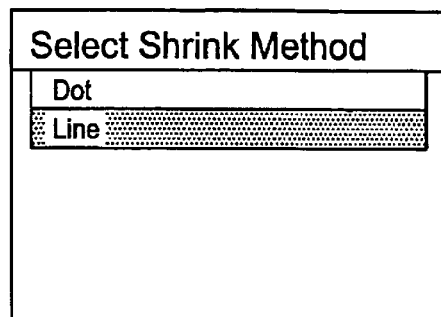
FIGS. 13A–13C are schematic diagrams showing an example of process and display images for operating the shrink function in the second embodiment of the present invention on the navigation system where the map image is shrinked relative to the reference line.
Figure 13B:
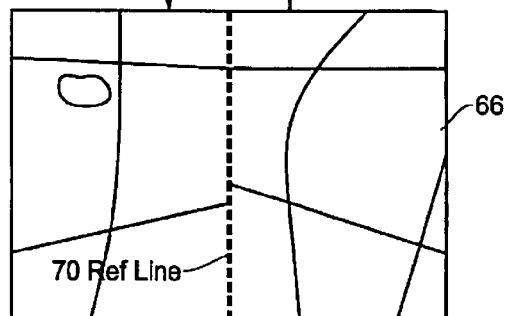
Figure 13C:
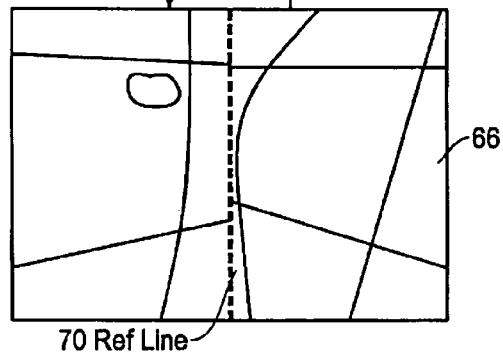

FIGS. 13A–13C show an example of process and display images for operating the shrink function on the navigation system after the process of FIG. 11 when selecting the "Line" method. The screen of FIG. 13A is the same as that of FIG. 11D except that the "Line" method is selected (highlighted). By pressing the enter key, the navigation system provides a shrinked map image of FIG. 13B in which the map images in the right and left sides are shrinked toward the reference line (fold line) 70 in the screen view 66. In other words, in this embodiment, only the images perpendicular to the reference line 70 are shrinked.

As noted above, because of the non-linear function such as the reverse parabolic function, the images at the reference line 70 or close to the reference line 70 are shrinked with a degree much higher than the images far away from the reference line 70. Thus, while the map images at around the reference line 70 may become invisible, the map images previously outside of the screen come in the screen view 66 without much decreasing their sizes. Accordingly, it is possible to quickly and easily see the places far away from the previous map image without scrolling around the map image. It should be noted that although the non-linear function is preferable for changing the shrink rate it is also possible to use the linear function for this purpose.

As described in the foregoing with reference to FIG. 8, the navigation system can change the non-linear curve by changing the coefficients from $a_1$ to $a_n$ to find an optimum shrink rate. Similar to FIGS. 12B and 12C, this can be done, for example, by pressing the enter key in the line shrink screen of FIG. 13B. Every time when the enter key is pressed, the navigation system changes the coefficient of the non-linear curve so that the images perpendicular to the reference line 70 are further shrinked toward the reference line 70 as shown in FIG. 13C. Conversely, when it is desired to decrease the shrink rate, the user can press the cancel key, for example, to find an optimum shrink rate. As seen from FIGS. 13B and 13C. the shrink rate of the images at the same perpendicular distance from the reference line are the same throughout the display screen.

In the second embodiment of the present invention where the map images are shrinked relative to the reference line, the navigation system can change the angle of the reference line 70 to select any desired directions of the map images. By changing the angle of (rotating) the reference line 70, any map image in the direction perpendicular to the reference line 70 can be shrinked toward the reference line 70 by the non-linear function. FIGS. 14A–14F show an example of process and display images for executing such functions of the present invention.

Figure 14A:
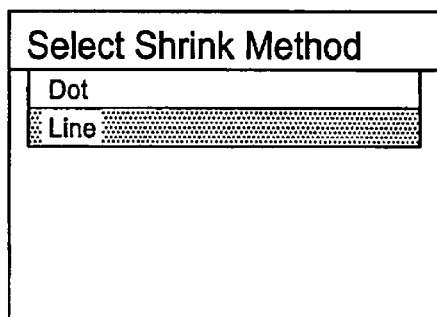
FIGS. 14A–14F are schematic diagrams showing an example of process and display images for operating the shrink function in the second embodiment of the present invention on the navigation system where the reference line is rotated in either a forward or backward direction.
Figure 14D:
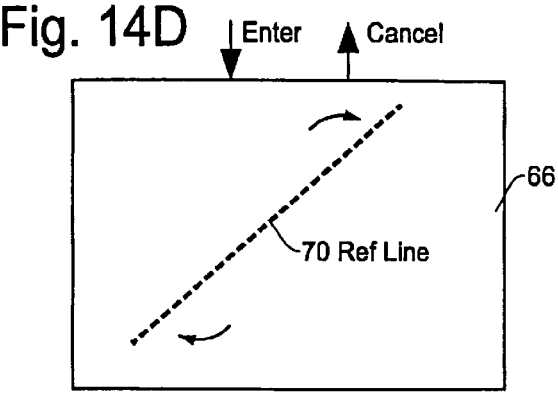
Figure 14B:
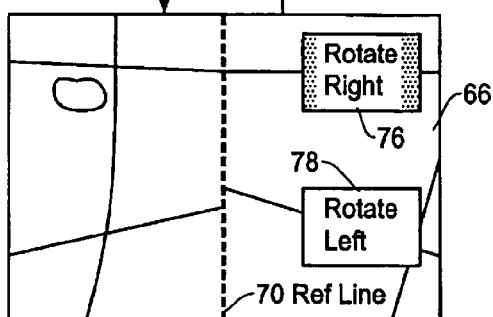

By selecting the "Line" method in FIG. 14A, the navigation system provides a shrinked map image of FIG. 14B in which the map images in the right and left sides are shrinked toward the reference line (fold line) 70 in the screen 66. Namely, only the images in the right and left directions, i.e., perpendicular to the reference line 70, are shrinked. In the example of FIG. 14B, the navigation system also provides a "Rotate Right" key 76 and a "Rotate Left" key 78 on the screen 66 for rotating the reference line 70 either in the right (clockwise) or left (counterclockwise) direction.

Suppose selecting the "Rotate Right" key 76 in FIG. 14B, the navigation system displays the screen for rotating the reference line 70. In the screen of FIG. 14C, every time when the enter key is pressed, the reference line 70 rotates in the right (clockwise) direction. Thus, by keep pressing the enter key, the reference line 70 is further rotated in the right direction as shown in FIG. 14D.

Figure 14E:
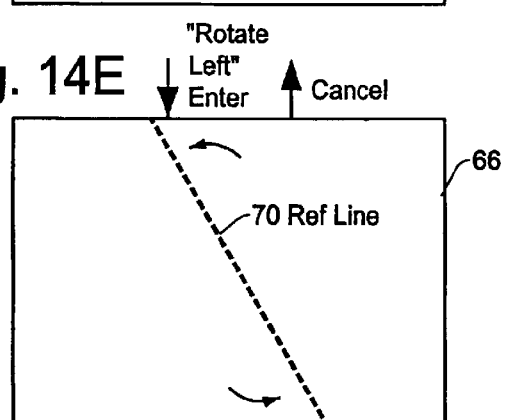
Figure 14C:
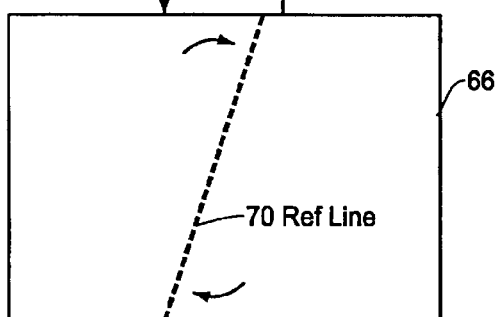
Figure 14F:
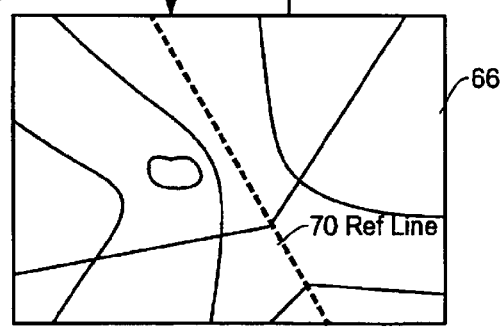

Conversely, when selecting the "Rotate Left" key 78 in the line shrink screen of FIG. 14B, the reference line 70 rotates in the left (counterclockwise) direction as shown in FIG. 14E. It should be noted that although the map images change with the rotation of the reference line 70, such map images are omitted in FIGS. 14C–14E for simplicity of illustration. Thus, for the angle of reference line 70 set in the process of FIG. 14E, the map images in the directions perpendicular to the reference line 70 are shrinked in a manner shown in FIG. 14F.

As has been described above, according to the present invention, the navigation method and system of the present invention is designed to easily and quickly display the map image that has been outside of the display screen without using the conventional scroll function or zoom function. The navigation method and system shrinks the image by a non-linear fashion relative to a center point or a reference line so that the images at around the center point or reference line shrink with higher degrees than that of the other portion. Thus, the map image that has been outside of the display screen will be drawn to the display screen without substantially decreasing the size thereof. Further, the map shrink function of the present invention is useful to see and compare two areas side by side, even when such two areas are far away and outside of the screen view.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for displaying a map image on a screen, comprising the following steps of:

displaying a map image on the screen and specifying a center point on the map image; and shrinking the map image coaxially relative to the center point based on a non-linear function in such a way that shrink rates of the map images at the same coaxial distance from the center point are the same throughout the screen;

wherein said step of shrinking the map image changes map scales greatly so that the map images shrink greatly for the distance close to the center point while changes the map scales slightly so that the map images shrink slightly for the distance far apart from the center point, whereby displaying images that have been outside of the screen within the screen.

2. A navigation method as defined in claim 1, wherein said step of applying the non-linear function includes a step of regulating said map scale by changing a coefficient of the non-linear function.

3. A navigation method as defined in claim 1, wherein said non-linear function is a reverse parabolic function applied to a relationship between a map scale of an image and a distance of the image from the center point.

4. A navigation method for displaying a map image on a screen, comprising the following steps of:

displaying a map image on the screen and specifying a reference line on the map image; and shrinking map images in directions perpendicular to the reference line based on a non-linear or linear function in such a way that shrink rates of the map images at the same perpendicular distance from the reference line are the same throughout the screen;

wherein said step of shrinking the map images changes map scales greatly so that the map images shrink greatly for the distance close to the reference line while changes the map scales slightly so that the map images shrink slightly for the distance far apart from the reference line, whereby displaying images both sides of the reference line in the directions perpendicular to the reference line that have been outside of the screen.

5. A navigation method as defined in claim 4, wherein said step of applying the non-linear function includes a step of regulating said map scale by changing a coefficient of the non-linear function.

6. A navigation method as defined in claim 4, wherein said step of specifying the reference line includes a step of changing an angle of the reference line thereby selecting map images in directions perpendicular to the reference line to be shrinked by the non-linear or linear function.

7. A navigation method as defined in claim 4, wherein said step of specifying the reference line includes a step of rotating the reference line in a clockwise direction or a counterclockwise direction thereby selecting map images in directions perpendicular to the reference line to be shrinked by the non-linear or linear function.

8. A navigation method as defined in claim 4, wherein said non-linear function is a reverse parabolic function applied to a relationship between a map scale of an image and a distance of the image from the reference line.

9. A navigation system for displaying a map image on a screen, comprising:

means for displaying a map image on the screen and specifying a center point on the map image; and means for shrinking the map image coaxially relative to the center point based on a non-linear function in such a way that shrink rates of the map images at the same coaxial distance from the center point are the same throughout the screen;

wherein said means for shrinking the map image changes map scales greatly so that the map images shrink greatly for the distance close to the center point while changes the map scales slightly so that the map images shrink slightly for the distance far apart from the center point, whereby displaying images that have been outside of the screen without much decreasing sizes thereof.

10. A navigation system as defined in claim 9, wherein said means for applying the non-linear function includes means for regulating said map scale by changing a coefficient of the non-linear function.

11. A navigation system as defined in claim 9, wherein said non-linear function is a reverse parabolic function applied to a relationship between a map scale of an image and a distance of the image from the center point.

12. A navigation system for displaying a map image on a screen, comprising:

means for displaying a map image on the screen and specifying a reference line on the map image; and means for shrinking map images in directions perpendicular to the reference line based on a non-linear function in such a way that shrink rates of the map images at the same perpendicular distance from the reference line are the same throughout the screen wherein said means for shrinking the map images changes map scales greatly so that the map images shrink greatly for the distance close to the reference line while chances the map scales slightly so that the map images shrink slightly for the distance far apart from the reference line, whereby displaying map images both sides of the reference line in the directions perpendicular to the reference line that have been outside of the screen without much decreasing sizes thereof.

13. A navigation system as defined in claim 12, wherein said means for applying the non-linear function includes means for regulating said map scale by changing a coefficient of the non-linear function.

14. A navigation system as defined in claim 12, wherein said means for specifying the reference line includes means for changing an angle of the reference line thereby selecting map images in directions perpendicular to the reference line to be shrinked by the non-linear or linear function.

15. A navigation method as defined in claim 12, wherein said means for specifying the reference line includes means for rotating the reference line in a clockwise direction or a counterclockwise direction thereby selecting map images in directions perpendicular to the reference line to be shrinked by the non-linear or linear function.

16. A navigation method as defined in claim 12, wherein said non-linear function is a reverse parabolic function applied to a relationship between a map scale of an image and a distance of the image from the reference line.

* * * * *